(12) United States Patent
Kuang (10) Patent No.: US 10,951,404 B1
(45) Date of Patent: Mar. 16, 2021

(54) METHODS AND SYSTEMS FOR DIGITAL MESSAGE ENCODING AND SIGNING

(71) Applicant: Quantropi Inc., Ottawa (CA)

(72) Inventor: Randy Kuang, Ottawa (CA)

(73) Assignee: Quantropi Inc., Ottawa (CA)

(*) Notice: Subject to any disclaimer, the term of this patent is extended or adjusted under 35 U.S.C. 154(b) by 0 days.

(21) Appl. No.: 16/921,583

(22) Filed: Jul. 6, 2020

Related U.S. Application Data (60) Provisional application No. 63/036,665, filed on Jun. 9, 2020.

(51) Int. Cl.
*H04L 29/00* (2006.01)
*H04L 9/08* (2006.01)

(52) U.S. Cl.
CPC .......... *H04L 9/0869* (2013.01); *H04L 9/0825* (2013.01)

(58) Field of Classification Search
CPC ............................ H04L 9/0869; H04L 9/0825
See application file for complete search history.

(56) References Cited

U.S. PATENT DOCUMENTS

| | | | | |
|---|---|---|---|---|
| 5,724,425 A * | 3/1998 | Chang | ................ | G06F 21/125 380/30 |
| 5,996,076 A * | 11/1999 | Rowney | ................ | G06F 21/445 705/76 |
| 6,188,768 B1 * | 2/2001 | Bethune | ................ | H04L 9/0858 380/278 |
| 6,665,405 B1 * | 12/2003 | Lenstra | ................ | H04L 9/3013 380/28 |
| 6,678,379 B1 * | 1/2004 | Mayers | ................ | H04B 10/70 380/256 |
| 6,801,626 B1 * | 10/2004 | Nambu | ................ | H04L 9/0858 380/255 |
| 7,065,210 B1 * | 6/2006 | Tsujii | ................ | H04L 9/083 380/259 |

(Continued)

OTHER PUBLICATIONS

Ryszard Horodecki, Pawel Horodecki, Michal Horodecki, and Karol Horodecki "Quantum entanglement" Reviews of Modern Physics. vol. 81, p. 865-942. Published Jun. 17, 2009. 78 pages. (Year: 2009).*

(Continued)

*Primary Examiner* — Don G Zhao
(74) *Attorney, Agent, or Firm* — Wolf, Greenfield & Sacks, P.C.

(57) ABSTRACT

A data communication system, in which a sender obtains a set of base data elements; generates a first and a second key from (i) the set of base data elements and (ii) sets of first and second entanglement data elements, the first and second keys comprised of a respective first and second public component and a respective first and second private component. A recipient generates first and second ciphers by encoding a digital message using the first and second public components; and sends the first and second ciphers towards the sender apparatus. The sender then extracts the digital message based on the first and second ciphers, the first and second private components, and the sets of first and second entanglement data elements. The private components are not derivable from the public components or from the ciphers irrespective of computing power. A method of digital signing and verification is also described.

30 Claims, 6 Drawing Sheets

(56) References Cited

U.S. PATENT DOCUMENTS

| | | | | |
|---|---|---|---|---|
| 7,570,767 | B2* | 8/2009 | Lo | H04L 1/0041 380/256 |
| 7,991,152 | B2* | 8/2011 | Gueron | G06F 7/724 380/28 |
| 9,219,604 | B2* | 12/2015 | Resch | H04L 9/3093 |
| 10,484,185 | B2* | 11/2019 | Fu | G06F 21/44 |
| 2005/0135627 | A1* | 6/2005 | Zavriyev | H04L 9/0852 380/278 |
| 2005/0190922 | A1* | 9/2005 | LaGasse | H04L 9/0858 380/278 |
| 2005/0286723 | A1* | 12/2005 | Vig | H04L 9/0855 380/278 |
| 2007/0076883 | A1* | 4/2007 | Kuang | H04L 9/0858 380/256 |
| 2007/0076888 | A1* | 4/2007 | Kuang | H04L 9/0858 380/278 |
| 2007/0087756 | A1* | 4/2007 | Hoffberg | G06Q 40/00 455/450 |
| 2007/0160212 | A1* | 7/2007 | Zavriyev | H04B 10/505 380/256 |
| 2008/0222734 | A1* | 9/2008 | Redlich | H04L 63/02 726/26 |
| 2010/0329447 | A1* | 12/2010 | Akiyama | H04L 9/3093 380/28 |
| 2012/0290830 | A1* | 11/2012 | Resch | H04L 9/0841 713/150 |
| 2015/0172292 | A1* | 6/2015 | Kuang | H04L 9/3226 713/155 |
| 2017/0063827 | A1* | 3/2017 | Ricardo | H04L 63/083 |
| 2017/0324553 | A1* | 11/2017 | Ahn | H04L 9/3226 |
| 2018/0109377 | A1* | 4/2018 | Fu | H04L 9/085 |
| 2019/0386832 | A1* | 12/2019 | Palyutina | H04L 67/16 |
| 2020/0084030 | A1* | 3/2020 | Nendell | H04L 63/083 |
| 2020/0266980 | A1* | 8/2020 | Grant | H04L 9/0825 |

OTHER PUBLICATIONS

Bourgain et al., Character Sums and Deterministic Polynomial Root Finding in Finite Fields. arXiv:1308.4803v2. Mar. 10, 2014. 11 pages.

Guodong et al., Quantum algorithm for polynomial root finding problem. 2014 Tenth International Conference on Computational Intelligence and Security. Nov. 15-16, 2014. pp. 469-473. doi: 10.1109/CIS.2014.40.

Chang et al., Quantum annealing for systems of polynomial equations. Scientific Reports. Jul. 16, 2019;9(1):10258. pp. 1-9. doi:10. 1038/s41598-019-46729-0.

* cited by examiner

METHODS AND SYSTEMS FOR DIGITAL MESSAGE ENCODING AND SIGNING

CROSS-REFERENCE TO RELATED APPLICATION

The present application claims the benefit of U.S. Provisional Patent Application Ser. No. 63/036,665, filed Jun. 9, 2020, hereby incorporated by reference herein.

FIELD

The present invention relates generally to digital security measures and, in particular, to methods and systems for encoding and signing digital messages.

BACKGROUND

There are many techniques for encoding and signing digital messages using digital keys. Generally speaking, in the case of encryption, a sender uses a recipient's publicly available (or public) key to encrypt a message and the recipient's private key is used to decrypt the message. The idea is for the holder of the private key to be the only one capable of decrypting the message. In the case of signing, a sender uses their private key to sign a message and the sender's public key is used by any recipient to verify the message. The idea here is for any recipient of a message purportedly from the sender to ascertain that the message was truly sent by that sender. In both encryption and signing, heavy reliance is placed on secretly guarding the private key and on the assumption that a user's private key cannot be cracked from other information, such as the user's public key and/or a message that was encrypted or signed with the user's private key. However, this assumption is becoming precarious for most public-private key algorithms, as computing power increases.

Specifically, for a typical public-private key algorithm, there is a relationship among the private key, the public key and the result of an encrypted or signed message. For example, it is common for the keys to be based on large prime numbers. With enough computing power, one could generate many candidate private keys and test for suitability of each with respect to a given public key. Knowledge of the pre-existing relationship between the public and private keys allows one to focus on a restricted set of possible candidates, effectively providing a "shortcut" to the private key. Advances in quantum computing make it increasingly feasible to find the right private key that is associated with a public key. As such, public-private key algorithms where one key is derivable from the other based merely on computational effort are becoming less secure by the day.

SUMMARY

What is needed is a key-based algorithm where calculating the private component from publicly available information is not an option, leaving brute force as the only remaining approach for an attacker to use.

Accordingly, there is provided a method of data communication, comprising obtaining a set of base data elements; generating a first key from (i) the set of base data elements and (ii) a set of first entanglement data elements, the first key comprised of a first public component and a first private component; generating a second key from (i) the set of base data elements and (ii) a set of second entanglement data elements, the second key comprised of a second public component and a second private component; receiving, from a recipient, a first cipher and a second cipher, the first cipher comprising a result of encoding a digital message using the first public component, the second cipher comprising a result of encoding the digital message using the second public component; and extracting the digital message based on the first and second ciphers, the first and second private component, and the sets of first and second entanglement data elements.

Also, there is provided a non-transitory computer-readable medium storing computer-readable instructions which, when read and executed by a processing unit, cause the processing unit to carry out a method of data communication that comprises: obtaining a set of base data elements from a the non-transitory medium; generating a first key from (i) the set of base data elements and (ii) a set of first entanglement data elements, the first key comprised of a first public component and a first private component; generating a second key from (i) the set of base data elements and (ii) a set of second entanglement data elements, the second key comprised of a second public component and a second private component; receiving, from a recipient, a first cipher and a second cipher, the first cipher comprising a result of encoding a digital message using the first public component, the second cipher comprising a result of encoding the digital message using the second public component; extracting the digital message based on the first and second ciphers, the first and second private component, and the sets of first and second entanglement data elements; and storing the digital message in the non-transitory medium.

Furthermore, there is provided a data communication system, comprising a sender apparatus associated with a public component and a private component; and a recipient apparatus. The sender apparatus is configured for: obtaining a set of base data elements; generating a first key from (i) the set of base data elements and (ii) a set of first entanglement data elements, the first key comprised of a first public component and a first private component; generating a second key from (i) the set of base data elements and (ii) a set of second entanglement data elements, the second key comprised of a second public component and a second private component; releasing the first and second public components. The recipient apparatus is configured for: obtaining the first and second public components; generating a first cipher by encoding a digital message using the first public component; generating a second cipher by encoding said digital message using the second public component; sending the first and second ciphers towards the sender apparatus. The sender apparatus is further configured for: receiving the first cipher and the second cipher from the recipient apparatus; and extracting the digital message based on the first and second ciphers, the first and second private component, and the sets of first and second entanglement data elements.

Also provided is a non-transitory computer-readable medium storing computer-readable instructions which, when read and executed by a processing unit of a network entity, cause the processing unit to carry out a method of data communication that comprises: (a) receiving, over a network, a first cipher and a second cipher, the first cipher comprising a result of encoding a digital message using a first public component associated with the network entity, the second cipher comprising a result of encoding the digital message using the second public component associated with the network entity; and (b) extracting the digital message based on the first and second ciphers and based on and locally stored data at the network entity that includes (i) first and second private components corresponding to the first and second public components, respectively, and (ii) sets of first and second entanglement data elements used for generating the first and second private components, respectively, and the first and second public components, respectively, using a common set of base data elements.

Additionally, there is provided a digital signature method, comprising: obtaining a digital message; first generating a first signature from a first public component, a first private component and the digital message; second generating a second signature from at least a second public component and the first signature; and creating a digitally signed message for transmission to a recipient, the digitally signed message comprising (i) the digital message or an original message from which the digital message is derived; (ii) a first verification code derived from a combination of the first public component and the digital message; (iii) a second verification code derived from a combination of the second public component and the second signature; and (iv) the second signature.

According to another aspect, there is provided a non-transitory computer-readable medium storing computer-readable instructions which, when read and executed by a processing unit, cause the processing unit to carry out a method of data communication that comprises: obtaining a digital message; first generating a first signature from a first public component, a first private component and the digital message; second generating a second signature from at least a second public component and the first signature; and creating a digitally signed message for transmission to a recipient, the digitally signed message comprising (i) the digital message or an original message from which the digital message is derived; (ii) a first verification code derived from a combination of the first public component and the digital message; (iii) a second verification code derived from a combination of the second public component and the second signature; and (iv) the second signature; storing the digitally signed message in the non-transitory medium or outputting a signal conveying the digitally signed message.

A further aspect provides a method of verifying authenticity of a digital message associated with a first verification code, a second verification code and a signature, the method comprising: obtaining from a source a first public component and a second public component associated with a sender of the digital message; deriving a first candidate verification code from the first public component and the digital message; deriving a second candidate verification code from the second public component and the signature; carrying out a first comparison of the first candidate verification code to the first verification code; carrying out a second comparison of the second candidate verification code to the second verification code; verifying of the digital authenticity of the digital message based on results of the first and second comparisons.

There is also provided a non-transitory computer-readable medium storing computer-readable instructions which, when read and executed by a processing unit, cause the processing unit to carry out a method of data communication that comprises: obtaining from a source a first public component and a second public component associated with a sender of the digital message; deriving a first candidate verification code from the first public component and the digital message; deriving a second candidate verification code from the second public component and the signature; carrying out a first comparison of the first candidate verification code to the first verification code; carrying out a second comparison of the second candidate verification code to the second verification code; verifying of the digital authenticity of the digital message based on results of the first and second comparisons; storing a result of the verifying or outputting a signal conveying the result of the verifying.

BRIEF DESCRIPTION OF THE DRAWINGS

These and other aspects of the present disclosure will now be described in greater detail having reference to the accompanying drawings, in which.

Those of skill in the art will appreciate that the drawings are to be taken as illustrative and not limiting.

DETAILED DESCRIPTION

Figure 1:
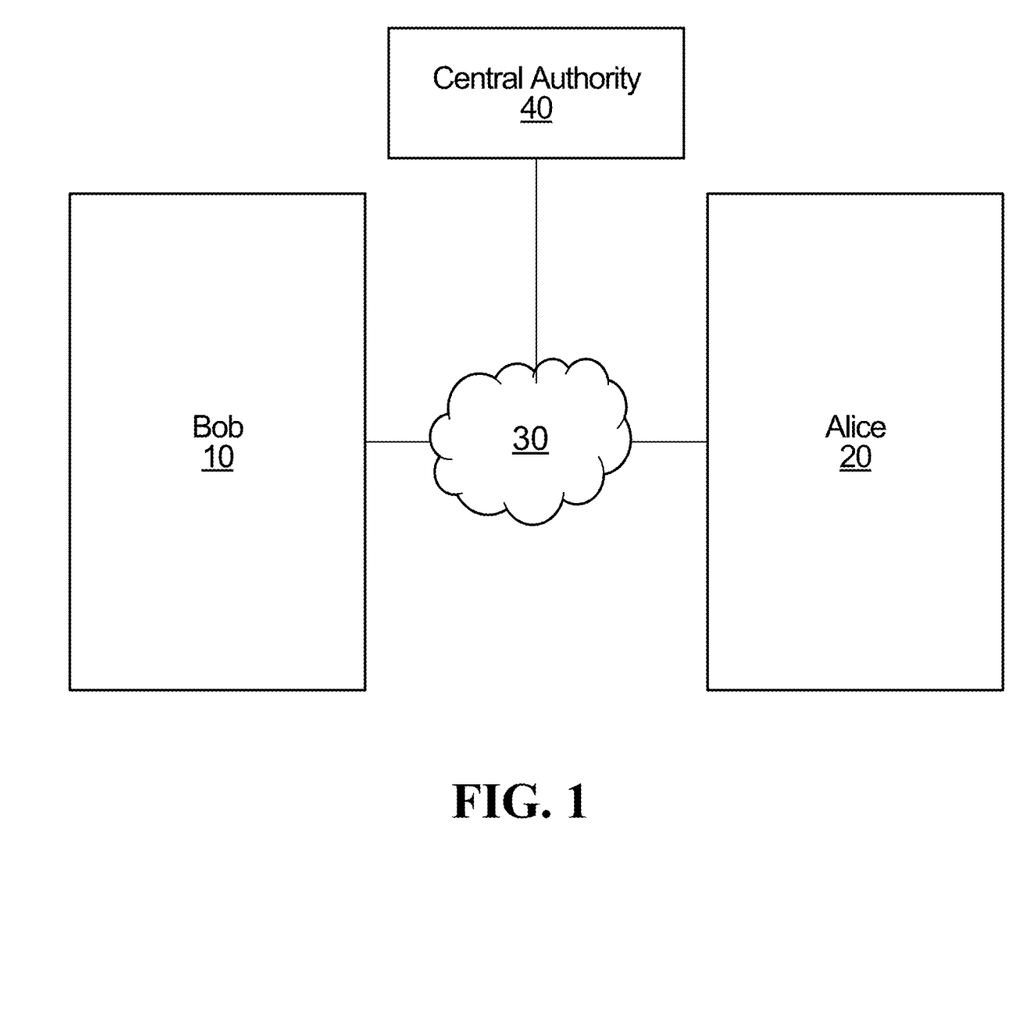
FIG. 1 is a lock diagram showing two computing apparatuses engaged in digital communications over a network.

Reference is made to FIG. 1, which illustrates two computing apparatuses 10, 20 participating in a message exchange over a communication network 30, such as the Internet. A convention is adopted herein according to which computing apparatus 10 is referred to as "Bob" and computing apparatus 20 is referred to as "Alice". Also illustrated is a central authority 40 connected to the Alice and Bob via the communication network 30; in some embodiments the central authority 40 may be implemented as a web server. It is noted that an existing communication network 30 (e.g., Internet and/or LAN) can be used, and that the computing apparatuses 10, 20 can be mobile devices, laptops, web servers, etc. adapted with software or firmware (e.g., an app or other program) for encrypting, decrypting, signing and verifying digital messages transmitted over the communication network 30.

In an embodiment, Bob generates at least two data elements, which can be referred to as "keys", each comprising a public component and private component, in the manner to be described below. Specifically, Bob's first key (P, $p_o$) includes a public component P and a private component $p_o$, whereas Bob's second key (Q, $q_o$) includes a public component Q and, in some embodiments, may also include a private component $q_o$. Bob's public components P, Q are made available to Alice directly or through the central authority 40. To this end, Bob may send Bob's public components P, Q to the central authority 40, and the central authority 40 may send Bob's public components P, Q to Alice upon request, or the central authority 40 may maintain Bob's public components P, Q in a database for consumption by Alice. Bob's private components $p_o$, $q_o$ are maintained by Bob securely in a memory of the computing apparatus associated with Bob.

There are at least two main use cases for the keys, one being encryption and the other one being signing. Other use cases may become apparent to those of skill in the art.

Encryption

Figure 2:
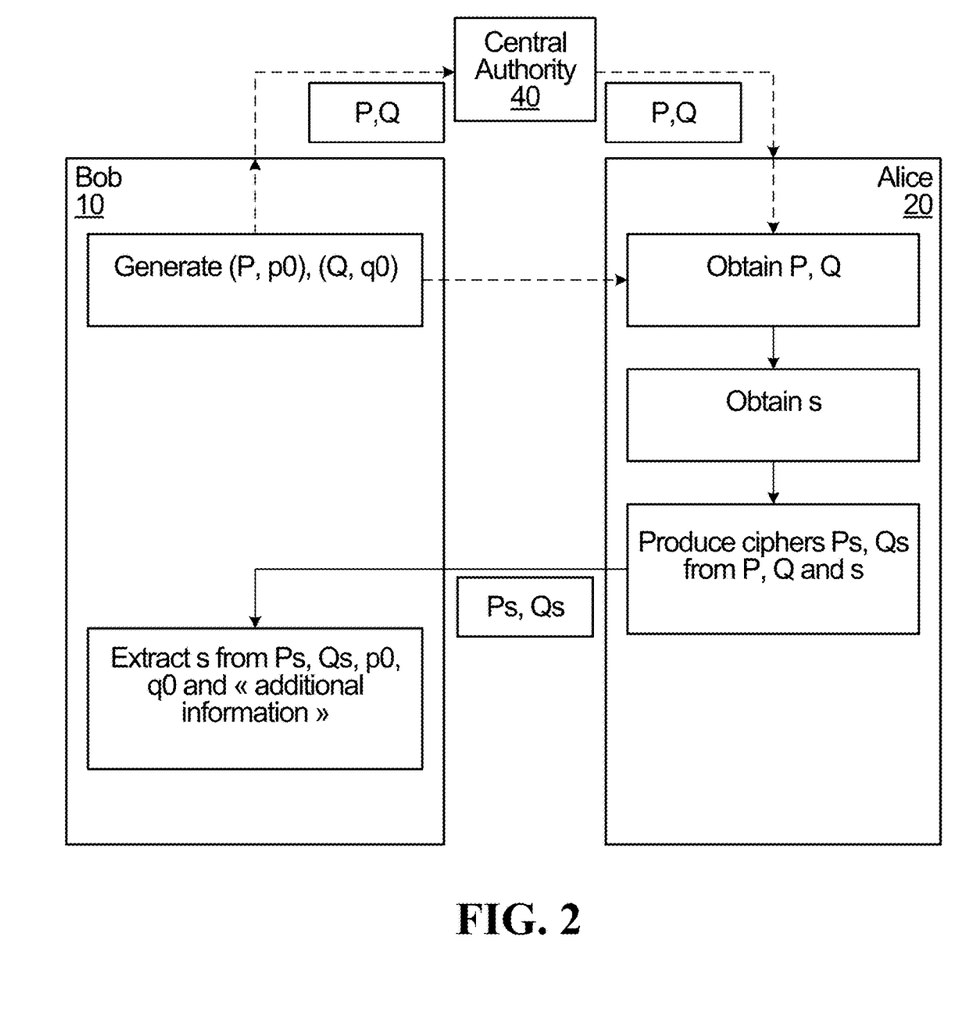
FIG. 2 is a signal flow diagram illustrating, at a general level, an encryption method in accordance with a non-limiting embodiment.

In the encryption use case, Alice wishes to securely send a digital message, denoted s, to Bob. The digital message s can be referred to as a "secret" message. To this end, and as shown in the signal flow diagram of FIG. 2, Alice produces two ciphers $P_s$, $Q_s$ from the secret message s and each of Bob's public components P, Q. Alice sends the ciphers $P_s$, $Q_s$ to Bob. Bob extracts the secret message s from (i) the ciphers $P_s$, $Q_s$; (ii) Bob's private components $p_0$, $q_0$; and (iii) certain "additional information" used to generate the keys (P, $p_0$), (Q, $q_0$). Because of this additional information (which is used in the generation of the keys in the manner described in greater detail herein below), only Bob can decrypt the ciphers $P_s$, $Q_s$ to extract the secret message s sent by Alice.

Figure 3:
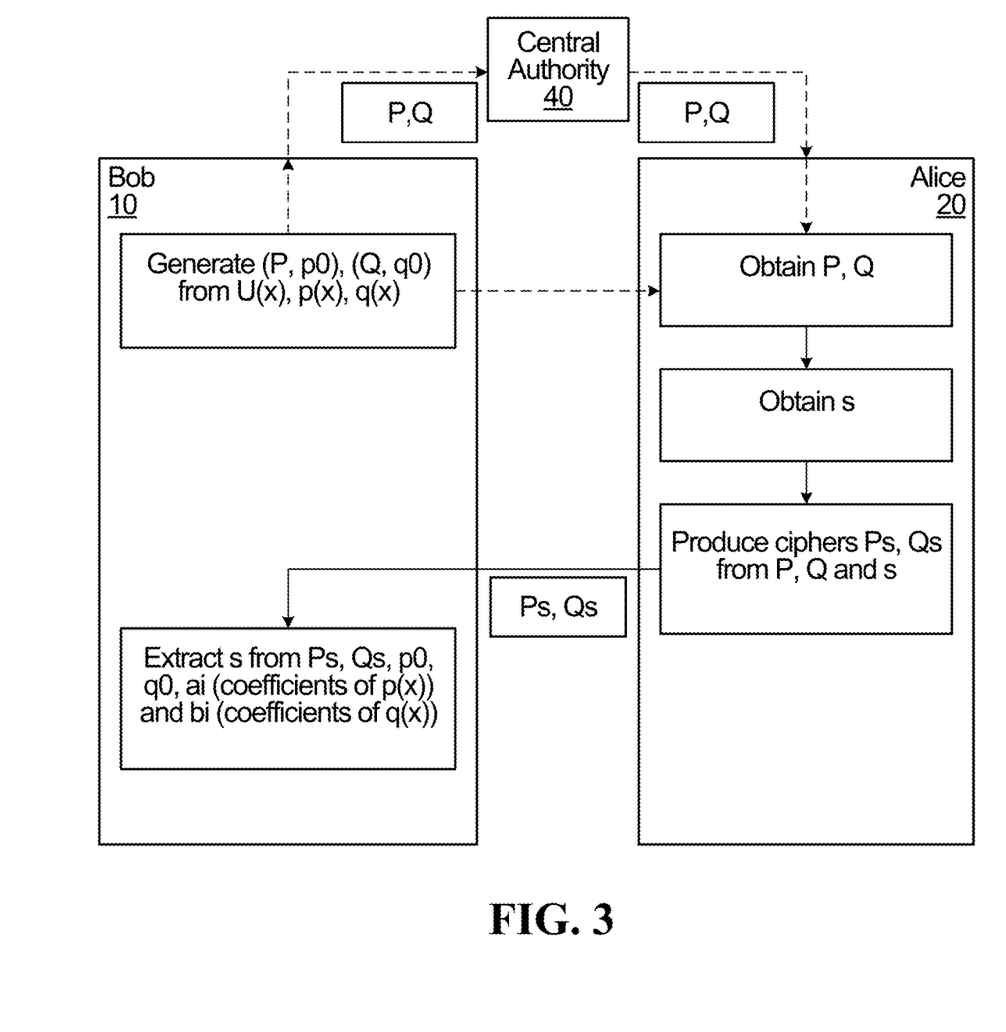
FIG. 3 is a more detailed version of the signal flow diagram of FIG. 2.

With additional reference to FIG. 3, generation of the keys (P, $p_0$) and (Q, $q_0$) is now described. Specifically, Bob selects a "base polynomial" U(x) and two "entanglement polynomials" p(x), q(x). The base polynomial U(x) has coefficients $u_i$, referred to as base data elements. Specifically, $u_i$ is the coefficient of $x^i$ (namely, x to the power i), where i ranges from 0 to n. The entanglement polynomials p(x), q(x) also have coefficients, referred to as entanglement data elements. Specifically, for the first entanglement polynomial p(x), $a_i$ is the coefficient of $x^i$, where i ranges from 0 to $n_p$, whereas for the second entanglement polynomial q(x), $b_i$ is the coefficient of $x^i$, where i ranges from 0 to $n_q$. For the purposes of this description, the variables (e.g., such as the secret message s), are defined over the Galois field $GF(2^N)$ where N is selected to be sufficiently high, such as 256 or higher, for example. The various polynomial coefficients themselves need not be N-bits long (e.g., they may be 32-bits, 64-bits, etc.). In a non-limiting embodiment, Bob's computing apparatus may comprise or implement a random number generation function for selecting the various coefficients $u_i$, $a_i$ and $b_i$.

In an embodiment, Bob generates the key (P, $p_0$) by multiplying the base polynomial U(x) with the first entanglement polynomial p(x). This gives a polynomial UP(x)=U(x)p(x) of degree n+$n_p$. The coefficients of the non-zero-order terms of this polynomial product are collectively referred to as Bob's public component P, whereas the coefficient of the zero-order term of this polynomial product is referred to as Bob's private component $p_0$. In other words, $UP(x)=p_0+(P_1x+P_2x^2+P_3x^3+\ldots+P_{n+n_p}x^{n+n_p})$, where $P_1 \ldots P_{n+n_p}$ are taken to be the elements of Bob's public component P, and each of the $P_i$ is a function of the coefficients $u_i$ of base polynomial U(x) and the coefficients $a_i$ of the first entanglement polynomial p(x).

Similarly, in an embodiment, Bob generates the key (Q, $q_0$) by multiplying the base polynomial U(x) with the second entanglement polynomial q(x). This gives a polynomial UQ(x)=U(x)q(x) of degree n+$n_q$. The coefficients of the non-zero-order terms of this polynomial product are collectively referred to as Bob's public component Q, whereas the coefficient of the zero-order term of this polynomial product is referred to as Bob's private component $q_0$. In other words, $UQ(x)=q_0+(Q_1x+Q_2x^2+Q_3x^3+\ldots+Q_{n+n_q}x^{n+n_q})$, where $Q_1 \ldots Q_{n+n_q}$ are the elements of Bob's public component Q, and each of the Q' is a function of the coefficients $u_i$ of base polynomial U(x) and the coefficients $b_i$ of the second entanglement polynomial q(x).

As will become clear from the description below, it may be advantageous to keep $n_p$ and $n_q$ to a lower order, such as 1 or 2 (with roots that are considered to be analytically calculable or mathematically solvable) and to keep n to a higher order, such as 5 or more (with roots that are at present considered to be analytically incalculable or mathematically unsolvable).

From Alice's perspective, Alice uses Bob's public component P as non-zero-order coefficients applied to the secret message s, thereby to generate the cipher $P_s$. Specifically, Alice generates $P_s=P_1s+P_2s^2+P_3s^3+\ldots+P_{n+n_p}s^{n+n_p}$, where $P_1 \ldots P_{n+n_p}$ are the elements of Bob's public component P. Also, Alice uses Bob's public component Q as non-zero-order coefficients applied to the secret message s, thereby to generate the cipher $Q_s$. Specifically, Alice generates $Q_s=Q_1s+Q_2s^2+Q_3s^3+\ldots+Q_{n+n_q}s^{n+n_q}$, where $Q_1 \ldots Q_{n+n_q}$ are the elements of Bob's public component Q. Alice then sends the ciphers $P_s$ and $Q_s$ back to Bob for decryption of the secret message s.

Bob is now the recipient of $P_s$ and $Q_s$, which are ciphers resulting from encryption of s with Bob's public components P and Q, respectively. In this context, recall that $$UP(s)=p_0+(P_1s+P_2s^2+P_3s^3+\ldots+P_{n+n_p}s^{n+n_p})=p_0+P_s$$

and $$UQ(s)=q_0+(Q_1s+Q_2s^2+Q_3s^3+\ldots+Q_{n+n_q}s^{n+2q})=q_0+Q_s.$$

Based on the above, consider a first expression for the quotient UP(s)/UQ(s):

$$UP(s)/UQ(s)=(p_0+P_s)/(q_0+Q_s), \quad \text{Equation 1}$$

from which it is noted that all of the terms $p_0$, $P_s$, $q_0$, $Q_s$ are known to Bob (with $P_s$, $Q_s$ having been received from Alice and $p_0$, $q_0$ having been securely stored in memory by Bob).

An important mathematical relationship is now exploited by Bob. Specifically, recall that UP(x)=U(x)p(x), and that UQ(x)=U(x)q(x). Therefore, one has:

$$UP(x)/UQ(x)=U(x)p(x)/U(x)q(x)=p(x)/q(x). \text{ In other words:}$$

$$UP(s)/UQ(s)=p(s)/q(s). \quad \text{Equation 2}$$

One can then equate the two expressions for the quotient, or modulo division, UP(s)/UQ(s) from Equations 1 and 2 above:

$$UP(s)/UQ(s)=p(s)/q(s)=(p_0+P_s)/(q_0+Q_s), \text{ which yields:}$$

$$(q_0+Q_s)*p(s)=(p_0+P_s)*q(s) \quad \text{Equation 3}$$

Assuming that p(s) and q(s) are solvable polynomials (e.g., $n_p$ and $n_q$ are 1 or 2, i.e., p(x) and q(x) are linear or quadratic), one can solve Equation 3 for s, which is the secret message sent by Alice.

Consider now that an attacker gains access to Bob's public components P, Q and to the ciphers $P_s$, $Q_s$. The attacker will be faced with the following problem:

$$P_1s+P_2s^2+P_3s^3+\ldots+P_{n+n_p}s^{n+n_p}=P_s$$

$$Q_1s+Q_2s^2+Q_3s^3+\ldots+Q_{n+n_q}s^{n+n_q}=Q_s$$

The attacker must solve for the roots of an (n+$n_p$)-th order equation and (n+$n_q$)-th order equation:

$$P_1s+P_2s^2+P_3s^3+\ldots+P_{n+n_p}s^{n+n_p}-P_s=0 \quad \text{Equation 4}$$

$$Q_1s+Q_2s^2+Q_3s^3+\ldots+Q_{n+n_q}s^{n+n_q}-Q_s=0 \quad \text{Equation 5}$$

It has been shown that the general form of Equations 4 and 5 does not have an analytical solution, when the degree of the equation is 5 or higher. Reference is made to the theorems of Abel-Ruffini and Galois (see Abel, N. H.

"Beweis der Unmöglichkeit, algebraische Gleichungen von höheren Graden als dem vierten allgemein aufzulösen" J. reine angew. Math. 1, 65, 1826; Abel, N. H. (1881) [1824], "Mémoire sur les équations algébriques, où l'on démontre l'impossibilité de la résolution de l'équation générale du cinquième degré", in Sylow, Ludwig (in French), (Œuvres Complètes de Niels Henrik Abel, I (2nd ed.), Grøndahl & Søn, pp. 28-33; Tignol, Jean-Pierre (2001). *Galois' Theory of Algebraic Equations*. World Scientific. pp. 232-3,302. ISBN 978-981-02-4541-2, all three documents are hereby incorporated by reference herein).

Given the above system of 2 such equations (Equations 4 and 5), making the degree of each equation n+1 or higher (i.e., 6 or higher) makes the system unsolvable for s using radicals or another analytical approach, at least based on the scientific limits of today.

Consequently, as long as each of $n+n_p$ and $n+n_q$ is 6 or higher (or n is at least 5, since $n_p$ and $n_q$ are at least 1), an attacker should be unable to solve Equations 4 and 5 for s. The attacker would need to try an arbitrary value of s to see whether the equation is solved. There is no "shortcut" (to a reduced number of candidates) if the base polynomial U(x) has a degree of at least n=5. This amounts to brute force guessing of the secret message s, which is not a viable approach when N is raised to 256 or higher, even using today's quantum computers.

Example

Consider that $p(x)=a_1x+a_0$ and $q(x)=b_1x+b_0$. From the above Equation 3, this leads to:

$$(q_0+Q_s)*(a_1s+a_0)=(p_0+P_s)*(b_1s+b_0), \text{ or:}$$

$$s=((b_0*(p_0+P_s)))-(a_0*(q_0+Q_s))/(((a_1*(q_0+Q_s))-(b_1*(p_0+P_s)))). \quad \text{Equation 6}$$

As such, the secret message s can be extracted by Bob. Specifically, Bob may compute the quotient of (i) a linear combination (e.g., a sum) of the first cipher $P_s$ and the first private component $p_0$ and (ii) a linear combination (e.g., a sum) of the second cipher $Q_s$ and the second private component $q_0$. In addition, Bob may derive the secret message s by computing a predetermined algebraic expression involving (i) said quotient, (ii) the first entanglement data elements $a_0$, $a_1$ and (iii) the second entanglement data elements $b_0$, $b_1$.

It is noted that all terms on the right of Equation 6 are known to Bob, and moreover $p_0$, $q_0$, $a_0$, $a_1$, $b_0$ and $b_1$ are known only to Bob. As such, the private components $p_0$, $q_0$ are intricately linked to the entanglement coefficients (in this case $a_0$, $a_1$, $b_0$, $b_1$) in order to form a truly secure "private key". Without $p_0$, $q_0$, $a_0$, $a_1$, $b_0$ and $b_1$, an attacker simply cannot solve for s, and is forced into brute force/trial and error, which makes the present technique highly secure.

As such, the base polynomial can be designed with a degree that is sufficiently high so that the secret message s is mathematically underivable from the first public component P and the first cipher $P_s$, and also mathematically underivable from the second public component Q and the second cipher $Q_s$.

The above encryption technique can be used to send a variety of confidential messages from Alice to Bob, including in real time, since there the encryption process is as simple as a polynomial calculation (and using modulo arithmetic). Of course, Bob can use the same technique to transmit confidential information to Alice by encrypting it with Alice's public components (e.g., obtained from the central authority), whereby Alice would decrypt such messages using its own version of $p_0$, $q_0$, $a_0$, $a_1$, $b_0$ and $b_1$.

Those of skill in the art will appreciate that N is chosen to be sufficiently high so that a brute force search for the roots of a polynomial of degree n (where n is at least 5 and possibly higher) is not a viable approach, even for a powerful quantum computer. A suitable value for N today appears to be 256 bits, but this may be increased (e.g., 512 or 1024 or more, and not necessarily a power of 2) in the future.

Those of skill in the art will also appreciate that all arithmetic computations above can be done modulo M, where M is a suitably large prime number over $GF(2^N)$. For example, M can be a randomly generated prime number between 2 and $2^N-1$. Module M division ensures accuracy of arithmetic operations, such as modulo division. (Generally speaking, for modulo division, M is only needed to be co-prime with the denominator, but this may be problematic since the denominator is unknown a priori, as such keeping M prime ensures accuracy.) The value of M may form part of the information openly shared or distributed by Bob, since Alice would need to know M in order to properly carry out its computations of the ciphers $P_s$, $Q_s$ using modulo arithmetic. As such, M may be a publicly variable associated with Bob and available to Alice.

Thus, there has been described a method of data communication, comprising obtaining a set of base data elements; generating a first key from (i) the set of base data elements and (ii) a set of first entanglement data elements, the first key comprised of a first public component and a first private component; generating a second key from (i) the set of base data elements and (ii) a set of second entanglement data elements, the second key comprised of a second public component and a second private component; receiving, from a recipient, a first cipher and a second cipher, the first cipher comprising a result of encoding a digital message using the first public component, the second cipher comprising a result of encoding the digital message using the second public component; and extracting the digital message based on the first and second ciphers, the first and second private component, and the sets of first and second entanglement data elements.

Clearly also, there has been described a non-transitory computer-readable medium storing computer-readable instructions which, when read and executed by a processing unit of a network entity, cause the processing unit to carry out a method of data communication that comprises: (a) receiving, over a network, a first cipher and a second cipher, the first cipher comprising a result of encoding a digital message using a first public component associated with the network entity, the second cipher comprising a result of encoding the digital message using the second public component associated with the network entity; and (b) extracting the digital message based on the first and second ciphers and based on and locally stored data at the network entity that includes (i) first and second private components corresponding to the first and second public components, respectively, and (ii) sets of first and second entanglement data elements used for generating the first and second private components, respectively, and the first and second public components, respectively, using a common set of base data elements.

Security analysis Consider a generic polynomial of degree n:

$$f(x)=a_n(x-r_1)(x-r_2)(x-r_3) \ldots (x-r_n)=a_nx^n+a_{n-1}x^{n-1}+a_{n-2}x^{n-2}+\ldots+a_1x+a_0$$

The above presents both forms, i.e., factors with undetermined roots $r_i$ for i from 1 to n and the completed expansion of root factors. There exist Viéta's formulas (see Hazewinkel, Michiel, ed. (2001) [1994], "*Viéte theorem*", Encyclopedia of Mathematics, Springer Science+Business Media B.V./Kluwer Academic Publishers, ISBN 978-1-55608-010-4, hereby incorporated by reference herein) to show the relationships between roots and coefficients as follows:

$$r_1 + r_2 + \ldots + r_{n-1} + r_n = \frac{a_{n-1}}{a_n}, \quad \text{Equation V1}$$

$$(r_1 r_2 + \ldots + r_1 r_n) + \quad \text{Equation V2}$$
$$(r_2 r_3 + \ldots + r_2 r_n) + \ldots + r_{n-1} r_n = \frac{a_{n-2}}{a_n},$$

$$\ldots$$

$$r_1 r_2 \ldots r_{n-1} r_n = (-1)^n \frac{a_0}{a_n}, \quad \text{Equation V3}$$

From the above Equations V1 through V3, it can be seen that the coefficient $a_n$ for the highest degree term does not impact the actual roots, it is only a scale factor to all other coefficients. Equation V1 shows the direct sum of all roots and Equation V2 shows the sum of all products of two unique roots, and so on, whereas Equation V3 is the constant term in the general polynomial which is the direct product of all roots.

Among all coefficients from $a_0$ to $a_n$, the constant term $a_0$ is unique and deserves special attention: it is independent from the variable x and impacts all roots in order to maintain the same values of the other n−1 coefficients. In other words, the roots are extremely sensitive to perturbations in the zero-order coefficient (constant term) $a_0$ in Equations V1 to V3. These characteristics naturally decouple the non-zero-order coefficients from the constant term $a_0$, hence making the constant term $a_0$ uniquely suitable to be a part of the private component of the key, with the non-zero order coefficients together being a public component of the key. Moreover, there is no apparent relationship between the public component and the private component, i.e., the private component cannot be derived (or "cracked") from the known public component.

Furthermore, looking back at Equations 4 and 5, if an attacker were to obtain a cipher $P_s$ at one time and to obtain another cipher $P_s'$ at another time, such attacker would not gain any benefit from intercepting more ciphers because each cipher would independently change the set of roots in order to maintain the same coefficients. Especially, all ciphers $P_s$ and $Q_s$ are independent from the private components $p_0$ and $q_0$, thus implying that the private component cannot be cracked from intercepted ciphers.

The above security analysis reveals that the private components $p_0$ and $q_0$ cannot be obtained through knowing both the public components P, Q and the ciphers $P_s$, $Q_s$.

Performance Analysis

The performance of the above-described key-based encryption algorithm depends on several factors: the CPU, the program used for implementation (Java, C/C++, python, etc.), the bit length N as well as the degree n of the polynomials. A prototype of the algorithm has been implemented in java with BigInteger class. The table below demonstrates the performance versus the degree of polynomials n and the bit length N of the coefficients and variables.

| | N = 256 bits | | N = 512 bits | | N = 1024 bits | |
|---|---|---|---|---|---|---|
| Degree n | Enc (ms) | Dec (ms) | Enc (ms) | Dec (ms) | Enc (ms) | Dec (ms) |
| 6 | 0.036 | 0.05 | 0.07 | 0.11 | 0.18 | 0.28 |
| 7 | 0.04 | 0.05 | 0.08 | 0.11 | 0.20 | 0.28 |
| 8 | 0.05 | 0.05 | 0.09 | 0.11 | 0.23 | 0.28 |

It should be noted that the results shown in this table are not for benchmarks but rather for research prototype results using a Windows™ 10 laptop with a x64 processor of Intel™ Core™ i5-8250U at 1.6 GHz. The results shown in the above table are an average over 5000 computation instances for each case in order to get more stable performance. For each given bit length N of 256, 512 and 1024 bits, the encryption time slightly increases as the degree of polynomials changes from n=6 to n=8, and the decryption time stays approximately the same as the degree n changes. It is also noticed that the time for decryption takes longer (5-7× for 256 bits and 7-10× for 512 and 1024 bits) than the time for encryption. The major contribution to this longer computation time for decryption is the modular inverses used in Equation 6 above.

Signing

In the signing use case, Bob wishes to sign a digital message, denoted d. The digital message d, which can be a digest of an original message m, can have a value between 0 and $2^N-1$, where N can be an arbitrarily large number. Accordingly, and as shown in the signal flow diagram of FIG. 4, Bob produces an "intermediate signature" $\sigma_p$ from (i) the message d; (ii) Bob's first public component P; and (iii) Bob's private component $p_0$. Then, Bob produces a "final signature" σ from (i) the intermediate signature $\sigma_p$ and (ii) Bob's second public component Q. Bob then sends the message d, the final signature σ and two "verification codes" $K_p$, $K_q$ to Alice. From Alice's perspective, Alice performs a verification process, which includes processing the message d, the final signature σ, the two verification codes $K_p$, $K_q$ and Bob's public components P, Q, in order to verify authenticity of the message d, i.e., to gain assurance that the message d did indeed originate from Bob.

Figure 4:
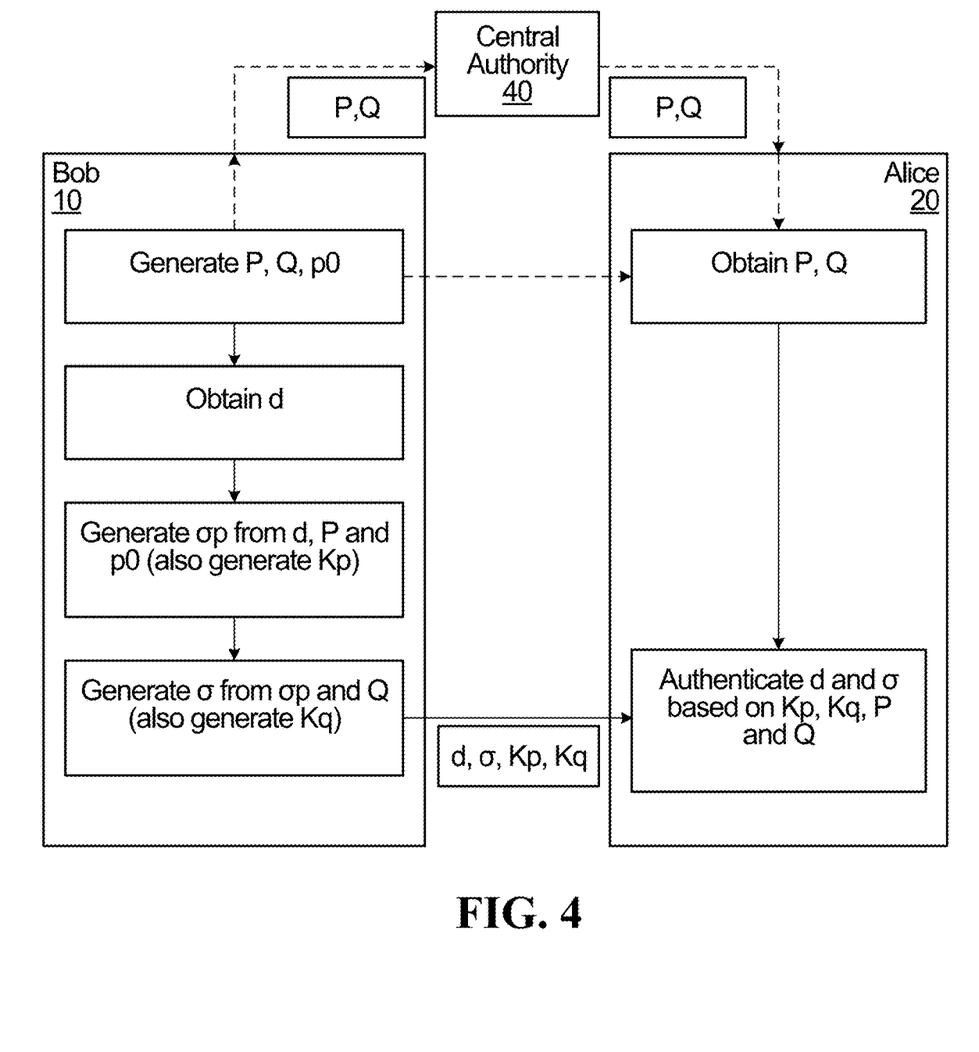
FIG. 4 is a signal flow diagram illustrating a digital signing and verification method in accordance with a non-limiting embodiment.

Bob's signing process is now described in greater detail. Consider the creation of the intermediate signature $\sigma_p$ from the message d, Bob's public component P and Bob's private component $p_0$. Specifically, Bob computes the first verification code $K_p = P_1 d + P_2 d^2 + P_3 d^3 + \ldots + P_{n1} d^{n1}$, where $P_1 \ldots P_{n1}$ are the elements of Bob's public component P and n1 can be an integer of 5 or more. Thereafter, then Bob computes the intermediate signature $\sigma_p = p_0 + K_p$.

Then, Bob computes the final signature $\sigma = Q_1(\sigma_p) + Q_2(\sigma_p)^2 + Q_3(\sigma_p)^3 + \ldots + Q_n(\sigma_p)^{n2}$, where $Q_1 \ldots Q_{n2}$ are the elements of Bob's public component Q and n2 can be an integer of 5 or more. Bob then computes the second verification code $K_q = Q_1 X + Q_2 X^2 + Q_3 X^3 + \ldots + Q_{n2} X^{n2}$.

Figure 5:
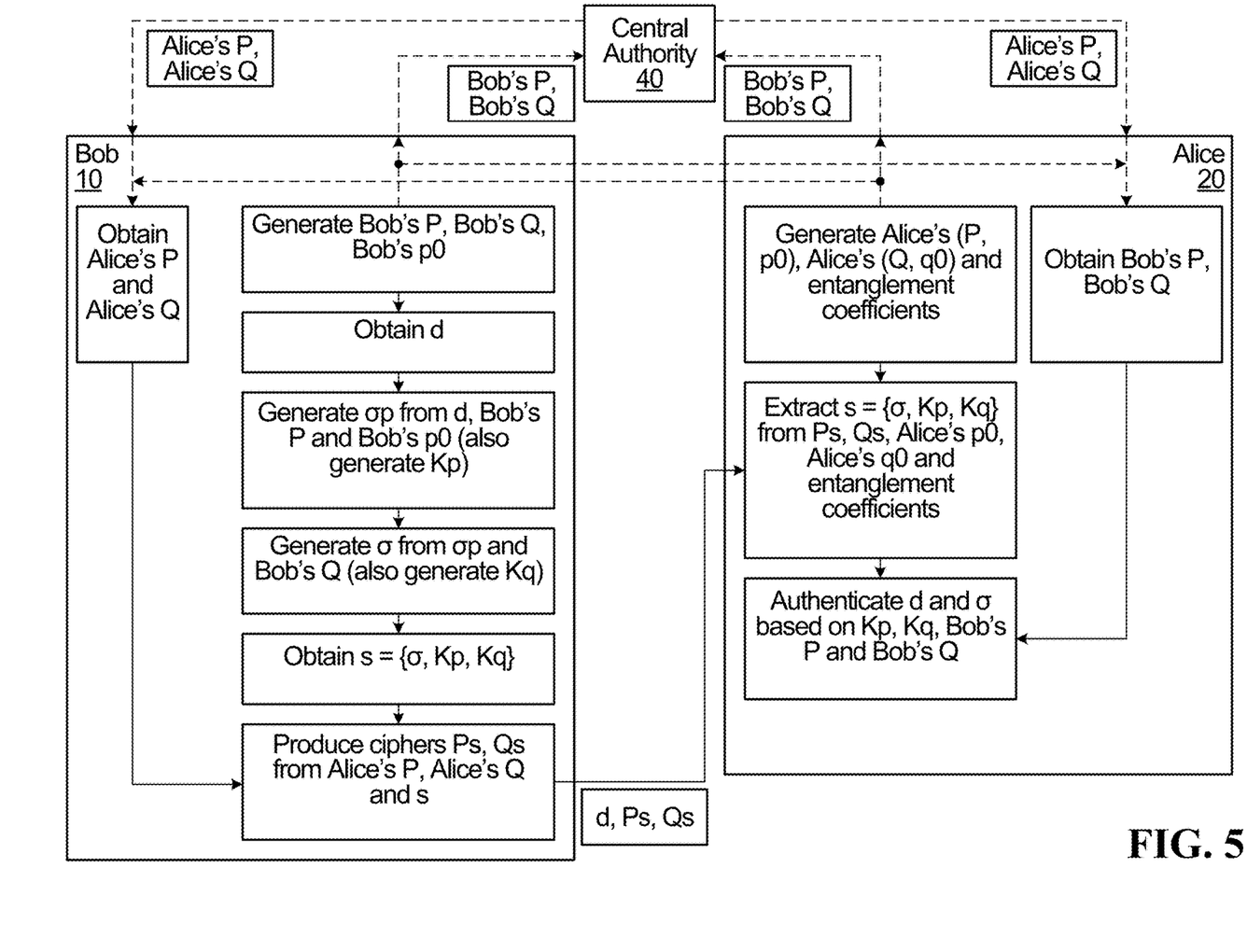
FIG. 5 is a signal flow diagram illustrating the digital signing and verification method of FIG. 4, combined with the encryption method of FIGS. 2 and 3.

When transmitting the message d, the verification codes $K_p$, $K_q$ and the final signature σ to Alice, there is an assumption that at least the verification codes and the final signature are transmitted securely, i.e., there is no tampering of this information between Bob and Alice. To ensure secure transmission of the verification codes $K_p$, $K_q$ and the final signature σ from Bob to Alice, and with reference to FIG. 5, Bob's verification codes $K_p$, $K_q$ and final signature σ can be encrypted using Alice's public components (Alice's P, Alice's Q) in much the same way as Alice encrypted the secret message s using Bob's public components in the example described above with reference to FIGS. 2 and 3. In this way, Alice decrypts Bob's verification codes $K_p$, $K_q$ and final signature σ using Alice's private components (Alice's $p_0$, Alice's $q_0$, as well as Alice's own entanglement coefficients which would have been used to generate Alice's P and Alice's Q), which would ensure there has been no tampering with the data sent by Bob. Other techniques for ensure secure transmission of the verification codes $K_p$, $K_q$ and the final signature σ to Alice are also possible.

From Alice's perspective, a verification process is performed, as is now described in greater detail.

Alice computes a candidate first verification code $K^*_p$ from the message d and Bob's first public component P, namely $K^*_p = P_1 d + P_2 d^2 + P_3 d^3 + \ldots + P_{n1} d^{n1}$ and compares $K^*_p$ to the first verification code $K_p$, which was securely received from Bob. If there is a match, this means that d is successfully verified/authenticated. Also, either before or after, or contemporaneously with computation of $K^*_p$, Alice computes a candidate second verification code $K^*_q$ from the securely received final signature σ and Bob's second public component Q, namely $K^*_q = Q_1 \sigma + Q_2 \sigma^2 + Q_3 \sigma^3 + \ldots + Q_{n2} \sigma^{n2}$ and compares $K^*_q$ to the second verification code $K_q$, which was securely received from Bob. If there is a match, this means that the final signature σ is successfully verified/authenticated.

The foregoing provides enhanced security because knowledge of the final signature σ and the message d does not reveal Bob's private component $p_0$. Specifically:

$$\sigma = Q_1(\sigma_p) + Q_2(\sigma_p)^2 + Q_3(\sigma_p)^3 + \ldots + Q_n(\sigma_p)^{n2},$$

and $\sigma_p = p_0 + P_1 d + P_2 d^2 + P_3 d^3 + \ldots + P_{n1} d^{n1}$.

Now, for simplicity, let n1=n2=n. Therefore, one has:

$$\sigma = F_0 + F_1 p_0 + F_2 (p_0)^2 + F_3 (p_0)^3 + \ldots + F_n (p_0)^n \quad \text{Equation 7}$$

for some coefficients $F_0$, $F_1$, etc. that are functions of the $\{P_i\}$ and the $\{Q_i\}$.

With n greater than or equal to 5, as per the Abel-Ruffini and Galois theorems, Equation 7 is considered to be unsolvable for the first private component $p_0$ using radicals, and therefore a third party has no shortcut. As a result, the third party can at best guess Bob's private component $p_0$ and, therefore, will not be able to emulate the manner in which signatures are generated by Bob.

Variant 1

For even greater security, $p_0$ can be replaced in the above calculations (and ultimately in Equation 7) with a function $p_d$ of ($p_0$ XOR d), as illustrated in the following non-limiting example:

$p_d$=Hash($p_0$ XOR d);

$\sigma_p = p_d + P_1 d + P_2 d^2 + P_3 d^3 + \ldots + P_{n1} d^{n1}$.

Other functions of the first private component $p_0$ and the digest d may be used to create $p_d$. Since $p_d$ created in this manner is unique for each signed message, this makes variable in the resulting Equation 7 unique for each signed message, thus making it unsolvable for n>=5, even if the same private component $p_0$ is used for each message.

Variant 2

In another variant, d can be replaced in the above calculations (and ultimately in Equation 7) with a function $p_d$ of ($p_0$ XOR d), as illustrated in the following non-limiting example:

$p_d$=Hash($p_0$ XOR d);

$\sigma_p = P_1 p_d + P_2 (p_d)^2 + P_3 (p_d)^3 + \ldots + P_{n1} (p_d)^{n1}$.

It is noted that the constant term $p_0$ is not used in this variant. Other functions of the first private component $p_0$ and the digest d may be used to create $p_d$. Since $p_d$ created in this manner is unique for each signed message, this makes variable in the resulting Equation 7 unique for each signed message, thus making it unsolvable for n>=5, even if the same private component $p_0$ is used for each message.

Variant 3

As seen from the above, Bob's second private component $q_0$ is not required for the digital signing use case. Nevertheless, in a variant, Bob's second private component $q_0$ can indeed be used to further enhance security, by generating a new quantity $q_d$:

$q_d$=Hash($q_0$ XOR d) and by calculating the final signature σ as:

$$\sigma = q_d + Q_1(\sigma_p) + Q_2(\sigma_p)^2 + Q_3(\sigma_p)^3 + \ldots + Q_n(\sigma_p)^{n2}.$$

Variant 4

In a variant, one can generate a new quantity:

$q_Q = (q_0$ XOR $\sigma_p)$ and then the final signature σ is generated as:

$$\sigma = Q_1(\sigma_Q) + Q_2(\sigma_Q)^2 + Q_3(\sigma_Q)^3 + \ldots + Q_n(\sigma_Q)^{n2}.$$

Variant 5

In another variant, the message d is a digest of an original message m. The digest d may be derived from the original message m in any suitable way, such as using various hash algorithms described in, for example, *Practical Cryptography: Algorithms and Implementations Using C++*, by Saiful Azad and Al-Sakib Khan Pathan (Editors), ISBN-10: 9781482228892, hereby incorporated by reference herein.

Those of skill in the art will appreciate that in some embodiments, all computations are done modulo M of the Galois field $GF(2^N)$. In the case of the digital signing use case, there is no division, and therefore M does not need to be a prime number. Instead, M can be a suitably large number, such as the largest number in the Galois Field $GF(2^N)$ (e.g., $2^{64}$ or $2^{128}$ being non-limiting examples). Alternatively, M is a randomly generated N-bit number, whereby M is a value associated with Alice and made available to Bob. Accordingly, Alice's computing apparatus may implement a random number generator, and the value of M may be communicated to Bob in a message or via the central authority 40.

Figure 6:
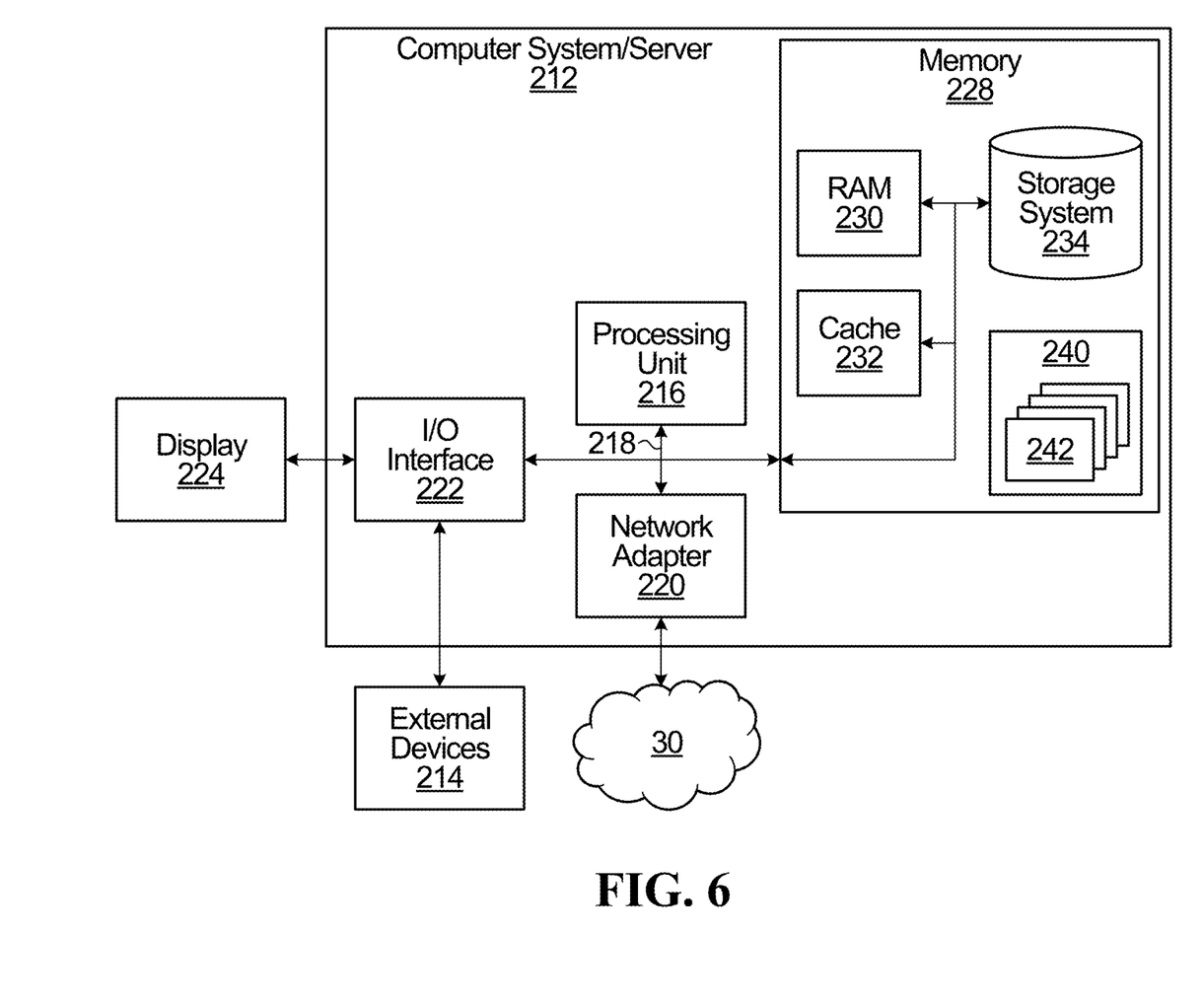
FIG. 6 is a block diagram showing the inner workings of a computing apparatus, in accordance with a non-limiting embodiment.

Referring now to FIG. 6, a schematic of an example of a computing apparatus, also referred to as a data processing system 210, is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above. Separate data processing systems 210 may be used to implement and/or perform the functionalities associated with Alice, Bob and/or the certification authority 40.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices (e.g., smartphones), multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the.

Program/utility 240, having a set (at least one) of program modules 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 may generally carry out the functions and/or methodologies of various embodiments as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

Embodiments may be a system, a method, and/or a computer program product. The computer program product may include a computer readable storage medium (or media) having computer readable program instructions thereon for causing a processor to carry out aspects of the disclosure, including processes or methods.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart/signal flow illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that throughout the specification discussions utilizing terms such as "processing", "computing", "calculating", "determining", "analyzing" or the like, refer to the action and/or processes of a computer or computing system, or similar electronic computing device, that manipulate and/or transform data represented as physical, such as electronic, quantities into other data similarly represented as physical quantities.

In some cases, calculations may be referred to as involving a "polynomial" in order to facilitate understanding of certain concepts and features; operations are nevertheless carried out electronically using arithmetic operations with arrays or other data structures. As such, where reference is made to data elements being coefficients of a polynomial, and where such data elements or coefficients are applied to another data element (such as the digital message) used as a variable of the polynomial, this may be carried out in machine language in a variety of ways, for example, by array multiplication or other arithmetic operations.

Additionally, reference throughout this disclosure to "one embodiment," "exemplary embodiment," or "an embodiment" means that a particular feature, structure or characteristic described in connection with the embodiment is included in at least one embodiment of the present invention. Thus, appearances of the phrases "in one embodiment," "in an exemplary embodiment," or "in an embodiment" in various places throughout this specification are not necessarily all referring to the same embodiment, although this may be the case in some instances. Furthermore, the particular features, structures or characteristics may be combined in any suitable manner, as would be apparent to one of ordinary skill in the art from this disclosure, in one or more embodiments. Similarly it should be appreciated that, in the above description of example embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects may lie in less than all features of a single foregoing disclosed embodiment. Thus, the claims following the Detailed Description are hereby expressly incorporated into this Detailed Description, with each claim standing on its own as a separate embodiment. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

As used herein, unless otherwise specified, the use of the ordinal adjectives "first", "second", "third", etc., to describe a common object or step, merely indicate that different instances of like objects or steps are being referred to, and are not intended to imply that the objects or steps so described must be in a given sequence, either temporally, spatially, in ranking, or in any other manner.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein may be equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

Also, when the phrase "at least one of A and B" is used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables.

The foregoing description and accompanying drawings illustrate the principles and modes of operation of certain embodiments. However, these embodiments should not be considered limiting. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of operating a computing device connected to a network for cryptographic communication over the network with a remote device, the method comprising:

obtaining a set of base data elements;

generating a first key based on (i) the set of base data elements and (ii) a set of first entanglement data elements, the first key comprised of a first public component and a first private component;

generating a second key based on (i) the set of base data elements and (ii) a set of second entanglement data elements, the second key comprised of a second public component and a second private component, wherein the first public component and the second public component are accessible to the remote device;

receiving, from the remote device, a first cipher and a second cipher, the first cipher comprising a result of encoding a digital message using the first public component, the second cipher comprising a result of encoding the digital message using the second public component; and extracting, at the computing device, the digital message based on the first and second ciphers, the first and second private components, and the sets of first and second entanglement data elements, such that the computing device and the remote device securely communicate over the network.

2. The method defined in claim 1, further comprising:
causing the first public component and the second public component to be sent to the remote device.

3. The method defined in claim 1, further comprising distributing the first and second public components via a central authority and storing the first and second private components securely in local memory.

4. The method defined in claim 1, further comprising:
sending the first public component and the second public component to the remote device.

5. The method defined in claim 1, wherein the base data elements are coefficients of a base polynomial of degree at least 5.

6. The method defined in claim 1, wherein the base data elements are coefficients of a base polynomial, the base polynomial selected to have a degree sufficiently high so that the digital message is mathematically underivable from the first public component and the first cipher, and so that the digital message component is mathematically underivable from the second public component and the second cipher.

7. The method defined in claim 1, wherein the first entanglement data elements are coefficients of a polynomial of degree 1 or 2, and wherein the second entanglement data elements are coefficients of a polynomial of degree 1 or 2.

8. The method defined in claim 1, wherein the base coefficients are coefficients of a base polynomial and wherein the first entanglement data elements are coefficients of a first entanglement polynomial, and wherein generating the first key from (i) the set of base data elements and (ii) the set of first entanglement data elements comprises multiplying the base polynomial and the first entanglement polynomial to obtain a first expanded polynomial, the first public component comprising the non-zero order coefficients of the first expanded polynomial and the first private component comprising the zero-order coefficient of the first expanded polynomial.

9. The method defined in claim 8, wherein the second entanglement data elements are coefficients of a second entanglement polynomial, and wherein generating the second key from (i) the set of base data elements and (ii) the set of second entanglement data elements comprises multiplying the base polynomial and the second entanglement polynomial to obtain a second expanded polynomial, the second public component comprising the non-zero order coefficients of the second expanded polynomial and the second private component comprising the zero-order coefficient of the second expanded polynomial.

10. The method defined in claim 9, wherein the base polynomial is of degree at least 5 and wherein the first and second expanded polynomials are each of degree at least 6.

11. The method defined in claim 1, wherein the extracting comprises computing the quotient of (i) a linear combination of the first cipher and the first private component and (ii) a linear combination of the second cipher and the second private component; and deriving the digital message from (i) said quotient, (ii) the first entanglement data elements and (iii) the second entanglement data elements.

12. The method defined in claim 11, wherein each said linear combination is the sum.

13. The method defined in claim 11, wherein deriving the digital message from (i) said quotient, (ii) the first entanglement data elements and (iii) the second entanglement data elements comprises computing a predetermined algebraic expression involving (i) said quotient, (ii) the first entanglement data elements and (iii) the second entanglement data elements.

14. The method defined in claim 1, further comprising using the digital message as an encryption key to encrypt a further digital message for transmission to the remote device.

15. The method defined in claim 1, further comprising obtaining the base data elements, the set of first entanglement data elements and the set of second entanglement data elements from non-transitory memory storage.

16. The method defined in claim 1, wherein the base data elements, further comprising implementing a random number generator to generate the first entanglement data elements and/or the second entanglement data elements.

17. The method defined in claim 1, wherein the first and second ciphers have a bit length of N, where N is at least as large as 256.

18. The method defined in claim 17, wherein calculations involving the base data elements, the first entanglement data elements and the second entanglement data elements are carried out modulo M, wherein M is selected to be a prime number.

19. The method defined in claim 17, wherein M is an N-bit output of a random number generator.

20. The method defined in claim 19, further comprising transmitting the value of M to the remote device or causing the value of M to be transmitted to the remote device.

21. A non-transitory computer-readable medium storing computer-readable instructions which, when read and executed by at least one processing unit associated with a computing device, cause the processing unit to carry out a method of cryptographic data communication over a network with a remote device, the method comprising that comprises:
obtaining a set of base data elements;
generating a first key from (i) the set of base data elements and (ii) a set of first entanglement data elements, the first key comprised of a first public component and a first private component;
generating a second key from (i) the set of base data elements and (ii) a set of second entanglement data elements, the second key comprised of a second public component and a second private component;
making the first public component and the second public component accessible to the remote device;
receiving, from the remote device, a first cipher and a second cipher, the first cipher comprising a result of encoding a digital message using the first public component, the second cipher comprising a result of encoding the digital message using the second public component;
extracting the digital message based on the first and second ciphers, the first and second private component, and the sets of first and second entanglement data elements; and
storing the digital message in computer memory associated with the computing device such that the computing device and the remote device securely communicate over the network.

22. The non-transitory computer-readable medium defined in claim 21, wherein the computing device is a mobile computing apparatus and the network is the Internet.

23. A data communication system, comprising:
a first apparatus associated with a public component and a private component; and
a second apparatus coupled to the first apparatus over a network;
the first apparatus configured for:
obtaining a set of base data elements;
generating a first key from (i) the set of base data elements and (ii) a set of first entanglement data elements, the first key comprised of a first public component and a first private component;
generating a second key from (i) the set of base data elements and (ii) a set of second entanglement data elements, the second key comprised of a second public component and a second private component; and
releasing the first and second public components, such that the first and second public components are accessible to the second apparatus;
wherein:
the second apparatus is configured for:
obtaining the first and second public components;
generating a first cipher by encoding a digital message using the first public component;
generating a second cipher by encoding said digital message using the second public component; and
sending the first and second ciphers over the network towards the first apparatus;
the first apparatus is further configured for:
receiving the first cipher and the second cipher from the second apparatus; and
extracting the digital message based on the first and second ciphers, the first and second private component, and the sets of first and second entanglement data elements such that the first and second apparatus perform cryptographic communication over the network.

24. The system defined in claim 23, wherein calculations involving the base data elements, the first entanglement data elements and/or the second entanglement data elements are carried out modulo M, wherein M is a prime number.

25. The system defined in claim 24, wherein the first apparatus is further configured for transmitting the value of M to the second apparatus or causing the value of M to be transmitted to the second apparatus.

26. The system defined in claim 23, wherein the second apparatus and the first apparatus are implemented as mobile computing devices connected to the Internet and operating in real time.

27. A non-transitory computer-readable medium storing computer-readable instructions which, when read and executed by a processing unit of a network entity, cause the processing unit to carry out a method of data communication that comprises:

receiving, over a network, a first cipher and a second cipher, the first cipher comprising a result of encoding a digital message using a first public component associated with the network entity, the second cipher comprising a result of encoding the digital message using the second public component associated with the network entity; and extracting the digital message based on the first and second ciphers and based on and locally stored data at the network entity that includes (i) first and second private components corresponding to the first and second public components, respectively, and (ii) sets of first and second entanglement data elements used for generating the first and second private components, respectively, and the first and second public components, respectively, using a common set of base data elements, such that the network entity performs cryptographic communication over the network with a remote device sending the first cipher and the second cipher.

28. The non-transitory computer-readable medium defined in claim 27, wherein the method further comprises causing the first and second public components to be sent to the remote device.

29. The non-transitory computer-readable medium defined in claim 27, wherein:

the base coefficients are coefficients of a base polynomial, the first entanglement data elements are coefficients of a first entanglement polynomial, the second entanglement data elements are coefficients of a second entanglement polynomial, upon multiplying the base polynomial and the first entanglement polynomial a first expanded polynomial is obtained, the first public component comprising the non-zero order coefficients of the first expanded polynomial and the first private component comprising the zero-order coefficient of the first expanded polynomial, upon multiplying the base polynomial and the second entanglement polynomial a second expanded polynomial is obtained, the second public component comprising the non-zero order coefficients of the second expanded polynomial and the second private component comprising the zero-order coefficient of the second expanded polynomial, and the base polynomial is of degree at least 5 and the first and second expanded polynomials are each of degree at least 6.

30. The non-transitory computer-readable medium defined in claim 27, wherein the extracting comprises computing the quotient of (i) a linear combination of the first cipher and the first private component and (ii) a linear combination of the second cipher and the second private component; and deriving the digital message by computing a predetermined algebraic expression involving (i) said quotient, (ii) the first entanglement data elements and (iii) the second entanglement data elements.

* * * * *

UNITED STATES PATENT AND TRADEMARK OFFICE
CERTIFICATE OF CORRECTION

PATENT NO. : 10,951,404 B1
APPLICATION NO. : 16/921583
DATED : March 16, 2021
INVENTOR(S) : Randy Kuang It is certified that error appears in the above-identified patent and that said Letters Patent is hereby corrected as shown below:

In the Claims

At Column 19, Claim 21, Lines 52-53:
"work with a remote device, the method comprising that comprises:"
Should read:
"work with a remote device, the method comprising:"

Signed and Sealed this
First Day of June, 2021

Drew Hirshfeld
*Performing the Functions and Duties of the*
*Under Secretary of Commerce for Intellectual Property and*
*Director of the United States Patent and Trademark Office*